United States Patent Office 3,156,617
Patented Nov. 10, 1964

3,156,617
THERAPEUTIC COMPOSITIONS OF KANA-
MYCIN 2-(PARA - TERTIARY - AMYLPHE-
NOXY)-n-BUTYRATE
Alphonse P. Granatek, Syracuse, and Frank H. Buck-
walter, De Witt, N.Y., assignors to Bristol-Myers Com-
pany, New York, N.Y., a corporation of Delaware
No Drawing. Filed Apr. 5, 1962, Ser. No. 185,244
5 Claims. (Cl. 167—65)

This invention relates to a novel antibacterial therapeutic agent and, more particularly, to kanamycin 2-(para-tertiary-amylphenoxy)-n-butyrate.

Kanamycin is a stable, basic, water-soluble, commercially available antibiotic first described by Umezawa et al. (See Umezawa et al., "Production and Isolation of a New Antibiotic, Kanamycin," The Journal of Antibiotics (Japan), Series A, X: 181–188, September 1957; Maeda et al. and Umezawa, "Studies on Kanamycin," The Journal of Antibiotics (Japan), Series A, X: 228–231, September 1957; Takeuchi et al. and Umezawa, "Biological Studies on Kanamycin," The Journal of Antibiotics (Japan), Series A, X: 107–114, May 1957; Cron et al. and Hooper, J. Amer. Chem. Soc. 80, 752–753, 2342 and 2911–2912, 1958, and Gourevitch et al., Antibiotics and Chemotherapy, 8 (3), 149–159, 1958; and the monograph on kanamycin which comprises volume 76, article 2, pages 17–408, of the Annals of the New York Academy of Sciences.)

Kanamycin exhibits effective therapeutic antibacterial activity against Gram-positive bacteria, Gram-negative bacteria and mycobacteria. In the treatment of systemic infections, it is poorly absorbed upon oral administration in the form of its free base, hydrochloride or sulfate and consequently has been administered by injection.

The advantages of oral over parenteral administration are well known and it is the object of the present invention to provide for oral administration in the therapy of systemic bacterial infections a form of kanamycin which is well-absorbed and nontoxic. It is also a specific object of the present invention to provide therapeutic compositions comprising kanamycin 2-(para-tertiary-amylphenoxy)-n-butyrate which are useful in the treatment of urinary tract infections. These infections are very frequent and give rise to many problems in their treatment. The micro-organisms causing the infections easily become resistant during treatment with an antibacterial agent, or are replaced by other species resistant to the drug. Furthermore, these infections cause much discomfort and pain to the patients.

The object of the present invention has been achieved by the provision, according to the present invention, of kanamycin 2-(para-tertiary-amylphenoxy)-n-butyrate and of therapeutic compositions comprising kanamycin 2-(para-tertiary-amylphenoxy)-n-butyrate.

Use is made of the kanamycin 2-(para-tertiary-amylphenoxy)-n-butyrate of the present invention in tablet or capsule form, e.g., as the pure chemical or admixed with a customary diluent such as lactose, in aqueous solutions or in suspensions in nontoxic oils and the like. Other agents may be combined with kanamycin 2-(para-tertiary-amylphenoxy)-n-butyrate in a therapeutic composition to provide increased scope of activity and usefulness. Such additional agents include lipotropic agents particularly methionine, choline, inositol and beta-sitosterol; laxatives, e.g., phenolphthalein; sedatives, e.g., barbiturates, bromides; an analgesic agent such as 2,6-diamino-3-phenylazopyridine and the nontoxic acid addition salts thereof; other antibiotic agents, e.g., penicillin salts, streptomycin, dihydrostreptomycin, bacitracin, polymixin, tyrotricin, erythromycin, carbomycin, tetracycline, oxytetracycline, chlortetracycline, chloramphenicol, cycloserine, novobiocin, colistin and the sulfa drugs, e.g., sulfisoxazole, sulfadiazine, sulfamerazine, sulfadimethine, sulfamethiazine, sulfacetamide, sulfamethylthiadiazol, sulfapyridine, and sulfathiazol, any of which may be used alone or in any combination of two or three sulfonamides; diuretics, such as chlorathiazide, hydroflumethiazide, hydrochlorathiazide, acetazolamide, etc.; and vitamins, e.g., vitamins A, $A_1$, $B_1$, $B_2$, $B_6$, $B_{12}$ and members of that family, vitamines C, $D_2$, $D_3$ and E, and folic acid and members of that family. In some cases such combinations attack a wider range of organisms or show synergistic efficacy or provide decreased toxicity with equal efficacy. The term "tetracycline" as used in this specification and the appended claims refers to tetracycline in all of its therapeutic forms, e.g., the amphoteric compound per se, hydrates, acid addition salts, alkali metal salts, alkaline earth and other metal salts, salts of ammonia or amines, chelates, double salts and complexes such as tetracycline sodium and potassium hexametaphosphate.

The dosage used is of course at the discretion of the attending physician but will frequently be, in terms of mgm. kanamycin base activity, 1.0–10.0 g. per day or preferably about 2.5 g. Dosage will frequently be divided, e.g., one or two 250 or 500 mgm. kanamycin base activity as kanamycin 2-(para-tertiary-amylphenoxy)-n-butyrate capsules four or six times a day. The theoretical potency of kanamycin 2-(para-tertiary-amylphenoxy)-n-butyrate is 660 mcg. of kanamycin base activity per mg. and accordingly a capsule containing 378 mg. kanamycin 2-(para-tertiary-amylphenoxy)-n-butyrate has the equivalent of 250 mg. kanamycin base activity. A preferred therapeutic composition according to the present invention is one comprising at least 250 mg. kanamycin base activity as kanamycin 2-(para-tertiary-amylphenoxy)-n-butyrate and at least 50 mg. of a member selected from the group consisting of 2,6-diamino-3-phenylazopyridine and the nontoxic acid addition salts thereof. Another composition of this invention comprises at least 250 mg. kanamycin base activity as kanamycin 2-(para-tertiary-amylphenoxy)-n-butyrate, at least 50 mg. of a member selected from the group consisting of 2,6-diamino-3-phenylazopyridine and the nontoxic acid addition salts thereof, and at least 250 mg. of a member selected from the group of soluble sulfonamides consisting of sulfisoxazole, sulfacetamide, sulfamethylthiadiazol and mixtures thereof.

The kanamycin molecule contains four basic salt forming groups and can therefore combine with 2-(para-tertiary-amylphenoxy)-n-butyric acid to form a kanamycin 2-(para-tertiary-amylphenoxy)-n-butyrate containing one, two, three or four molecules of 2-(para-tertiary-amylphenoxy)-n-butyric acid; the salt containing one molecule of 2-(para-tertiary-amylphenoxy)-n-butyric acid is preferred but all are useful and part of the present invention. In the present invention use is normally made of the mixture of kanamycin A and kanamycin B obtained directly by fermentation and extraction but, if desired, either pure kanamycin A or pure kanamycin B may be used or use may be made of a mixture of equal parts by weight of kanamycin A and kanamycin B. All are of approximately equal antibacterial effectiveness except again mycobacteria; in that case, use of pure or nearly pure kanamycin A is preferred.

The acid used in preparing the product of this invention, 2-(para-tertiary-amylphenoxy)-n-butyric acid, is known and is available commercially and has the following structural formula

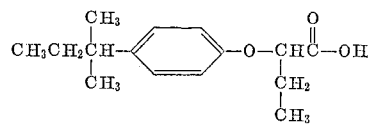

The following examples illustrate the invention but are not to be construed as limiting the same.

EXAMPLE I

*Preparation of Kanamycin 2-(Para-Tertiary-Amylphenoxy)-n-Butyrate*

A solution of 2-(para-tertiary-amylphenoxy)-n-butyric acid (5.15 g.) in 100 ml. of methanol is prepared and added with stirring together with 400 ml. of methanol to a solution of kanamycin base (10.0 g.) in 20 ml. of distilled water. The solution is evaporated to dryness using methanol to aid in the drying. The product, kanamycin 2-(para-tertiary-amylphenoxy)-n-butyrate, weighs 14.0 g. and has a potency of 530 mcg. of kanamycin base activity per mg. The theoretical potency is 660 mcg./mg. Kanamycin A-2-(para-tertiary-amylphenoxy)-n - butyrate is prepared according to the procedure described above when pure kanamycin A is used in place of the mixed kanamycin A and B.

EXAMPLE II

*Preparation of Kanamycin 2-(Para-Tertiary-Amylphenoxy)-n-Butyrate*

A solution of kanamycin base (150.0 gm.) in 300 cc. of distilled water and a solution of 2-(para-tertiary-amylphenoxy)-n-butyric acid (77.2 gm.) in 1500 cc. of methanol were mixed and to the resulting mixture was added 6000 cc. of methanol with stirring. The resulting mixture was flash evaporated to dryness and the product, kanamycin 2-(para-tertiary-amylphenoxy)-n-butyrate, obtained as a light cream-colored, water-soluble solid which was dried in vacuum, screened and found by bioassay to have a potency of 670 mcg./mg. (Theoretical potency= 660 mcg. of kanamycin base activity/mg.)

EXAMPLE III

One capsule containing 500 mg. kanamycin base activity as kanamycin sulfate is administered orally to each of 10 human subjects. The total amounts of kanamycin base activity excreted in the urine of each subject during various periods thereafter is determined to be as set forth in Table A.

TABLE A.—KANAMYCIN URINE CONCENTRATIONS IN HUMAN SUBJECTS—ORAL ADMINISTRATION OF KANAMYCIN SULFATE

| Patient | Age | Sex | Wt. | Urine in Volume and Concentration | | | | | | | | Total mg. Excreted in 24 Hours |
|---|---|---|---|---|---|---|---|---|---|---|---|---|
| | | | | 0–6 Hours | | 6–12 Hours | | 12–18 Hours | | 18–24 Hours | | |
| | | | | Volume in cc. | Mcg.[1] per cc. | Volume in cc. | Mcg.[1] per cc. | Volume in cc. | Mcg.[1] per cc. | Volume in cc. | Mcg.[1] per cc. | |
| A | 56 | M | 118 | 590 | 4.5 | 360 | 3.65 | 470 | 1.70 | 110 | 5.3 | 5.35 |
| B | 41 | F | 115 | 90 | 120 | 160 | 26 | 200 | 5.80 | 80 | 3.95 | 16.44 |
| C | 43 | F | 148 | 715 | 1.10 | 160 | 4.50 | 215 | 1.30 | 300 | <1.0 | 1.79 |
| D | 36 | F | 170 | 500 | 4.80 | 640 | 4.20 | 525 | <1.0 | 350 | <1.0 | 5.09 |
| E | 39 | M | 190 | 220 | 18.00 | 315 | 9.40 | 120 | 3.50 | 315 | <1.0 | 7.34 |
| F | 39 | M | 180 | 50 | 7.90 | 80 | 20.50 | 385 | 1.80 | 275 | 1.40 | 3.11 |
| G | 44 | F | 104 | 845 | 8.30 | 670 | 3.10 | 620 | 4.20 | 465 | <1.0 | 11.69 |
| H | 47 | F | 133 | 725 | 6.00 | 210 | 5.00 | 355 | <1.00 | 405 | <1.0 | 5.40 |
| I | 30 | M | 168 | 180 | 17.50 | 300 | 7.10 | 885 | <1.00 | 250 | 8.90 | 7.51 |
| J | 24 | M | 187 | 385 | 6.00 | 930 | 1.60 | 1,020 | <1.0 | 330 | 3.45 | 4.94 |
| Average | | | | | | | | | | | | 6.87 |

[1] Micrograms of kanamycin base activity per cc. of urine.

EXAMPLE IV

The ability of kanamycin 2-(para-tertiary-amylphenoxy)-n-butyrate to provide useful amounts of kanamycin base activity in the urine is demonstrated by a clinical trial in which two capsules, each containing 250 mg. kanamycin base activity as kanamycin 2-(para-tertiary-amylphenoxy)-n-butyrate, are administered to each of 5 human subjects. The total amount of kanamycin base activity excreted in the urine of each subject during various periods thereafter is determined to be as set forth below in Table B.

From Table A of Example III it can be seen that the average amount of kanamycin base activity excreted in the urine of the subjects taking kanamycin sulfate is 6.87 mg. which is 1.37% of the dose given. The superiority of kanamycin 2-(para-tertiary-amylphenoxy)-n-butyrate is demonstrated in Table B by showing that the average amount of kanamycin base activity excreted in the urine of subjects taking 500 mg. kanamycin base activity as kanamycin 2-(para-tertiary-amylphenoxy)-n-butyrate is 21.55 mg. or 4.27% of the dose given.

TABLE B.—KANAMYCIN URINE CONCENTRATION IN HUMAN SUBJECTS—ORAL ADMINISTRATION OF KANAMYCIN 2-(PARA-TERTIARY-AMYLPHENOXY)-N-BUTYRATE

| Patient | Excretions of Kanamycin Base Activity in Urine | | | | | | | | | Total Mg. Excreted |
|---|---|---|---|---|---|---|---|---|---|---|
| | 0–6 Hours | | | 6–12 Hours | | | 12–24 Hours | | | |
| | Vol. in cc. | Mcg. per cc. | Mg. Excreted | Vol. in cc. | Mcg. per cc. | Mg. Excreted | Vol. in cc. | Mcg. per cc. | Mg. Excreted | |
| 1 | 300 | 58 | 17.40 | 640 | 7.2 | 4.61 | 800 | <1 | | 22.01 |
| 2 | 180 | 43 | 7.74 | 320 | 51 | 16.32 | 480 | 14 | 6.72 | 30.78 |
| 3 | 220 | 47 | 10.34 | 330 | 7.6 | 2.51 | 350 | 6 | 23.10 | 35.95 |
| 4 | 225 | <1 | | 420 | 10 | 4.20 | 380 | <1 | | 4.20 |
| 5 | 280 | 31 | 8.68 | 525 | 9.8 | 5.15 | 470 | <1 | | 13.83 |
| Average | | | 8.83 | | | 6.56 | | | 5.96 | 21.35 |

EXAMPLE V

In the preparation of the kanamycin 2-(para-tertiary-amylphenoxy)-n-butyrate capsules used in the clinical trial described in Example III above, kanamycin 2-(para-tertiary-amylphenoxy)-n-butyrate having a potency of 643 mcg. of kanamycin base activity per mg., prepared as described in Example II above, was filled into capsules. Each capsule contained 389 mg. of kanamycin 2-(para-tertiary-amylphenoxy)-n-butyrate which is equivalent to 250 mg. kanamycin base activity.

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:

1. Kanamycin 2-(para-tertiary-amylphenoxy)-n-butyrate.

2. Kanamycin A-2-(para-tertiary-amylphenoxy-n-butyrate.

3. A composition in oral unit dosage form useful in the treatment of urinary tract infections comprising at least 250 mg. kanamycin base activity as kanamycin 2-(para-tertiary-amylphenoxy)-n-butyrate and at least 50 mg. of a member selected from the group consisting of 2,6-diamino-3-phenylazopyridine and the nontoxic acid addition salts thereof.

4. A composition in oral unit dosage form useful in the treatment of urinary tract infections comprising at least 250 mg. kanamycin base activity as kanamycin 2-(para-tertiary-amylphenoxy)-n-butyrate, at least 50 mg. of a member selected from the group consisting of 2,6-diamino-3-phenylazopyridine, and at least 250 mg. of a member selected from the group of soluble sulfonamides consisting of sulfisoxazole, sulfacetamide, sulfamethyliadiazol and mixtures thereof.

5. A composition in oral unit dosage form useful in the treatment of urinary tract infections comprising at least 250 mg. of kanamycin 2-(para-tertiary-amylphenoxy)-n-butyrate, at least 50 mg. of a member selected from the group consisting of 2,6-diamino-3-phenylazopyridine, and at least 250 mg. of tetracycline.

References Cited in the file of this patent

UNITED STATES PATENTS

| | | |
|---|---|---|
| 2,838,552 | Gansau et al. | June 10, 1958 |
| 2,931,798 | Umezawa et al. | Apr. 5, 1960 |
| 3,000,874 | Bray et al. | Sept. 19, 1961 |
| 3,022,219 | Celmer | Feb. 20, 1962 |
| 3,087,858 | Buckwalter et al. | Apr. 30, 1963 |